US008561254B2

(12) United States Patent
Roden

(10) Patent No.: US 8,561,254 B2
(45) Date of Patent: Oct. 22, 2013

(54) SYSTEMS AND METHODS FOR TRANSFERRING HEAT AND/OR SOUND DURING FLUID EXTRACTION AND/OR CLEANING PROCESSES

(75) Inventor: Michael J. Roden, Prescott, AZ (US)

(73) Assignee: Sapphire Scientific, Prescott, AZ (US)

( * ) Notice: Subject to any disclaimer, the term of this patent is extended or adjusted under 35 U.S.C. 154(b) by 856 days.

(21) Appl. No.: 12/702,217

(22) Filed: Feb. 8, 2010

(65) Prior Publication Data

US 2010/0200080 A1 Aug. 12, 2010

Related U.S. Application Data

(60) Provisional application No. 61/150,931, filed on Feb. 9, 2009.

(51) Int. Cl.
*F16L 53/00* (2006.01)

(52) U.S. Cl.
USPC .................... 15/326; 15/320; 15/321; 15/322

(58) Field of Classification Search
USPC .................................... 15/320, 321, 322, 326
See application file for complete search history.

(56) References Cited

U.S. PATENT DOCUMENTS

| | | | |
|---|---|---|---|
| 1,929,345 | A | 10/1933 | Brown et al. |
| 2,624,063 | A | 1/1953 | Van Der Heem |
| 3,594,849 | A | 7/1971 | Coshow |
| 3,697,771 | A | 10/1972 | Colt |
| 3,701,343 | A | 10/1972 | Bowers |
| 3,774,261 | A | 11/1973 | Colt |
| 3,919,729 | A | 11/1975 | Cannan |
| 3,958,298 | A | 5/1976 | Cannan |
| 3,964,925 | A | 6/1976 | Burgoon |
| 4,109,340 | A | 8/1978 | Bates |
| 4,153,968 | A | 5/1979 | Perkins |
| 4,207,649 | A | 6/1980 | Bates |
| 4,284,127 | A | 8/1981 | Collier et al. |
| 4,336,627 | A | 6/1982 | Bascus |
| 4,443,909 | A | 4/1984 | Cameron |
| 4,475,264 | A | 10/1984 | Schulz |
| 4,531,928 | A | 7/1985 | Ikenoya |

(Continued)

FOREIGN PATENT DOCUMENTS

AU 736546 B2 8/2001

OTHER PUBLICATIONS

International Search Report and Written Opinion for International Application No. PCT/US2010/023519, Mail Date Apr. 16, 2010, 15 pages.

*Primary Examiner* — Joseph J Hail
*Assistant Examiner* — Henry Hong
(74) *Attorney, Agent, or Firm* — Perkins Coie LLP

(57) ABSTRACT

Systems and methods for transferring heat and/or sound during liquid extraction and/or cleaning processes are disclosed. A fluid extraction system in accordance with a particular embodiment includes a fluid extractor having an outlet positioned to deliver extracted waste fluid, and a fluid tank operatively coupled to the extractor. A blower, having an air intake and an air outlet through which blower air passes, is operatively coupled to the extractor outlet to draw the extracted waste fluid from the extractor. A muffler is positioned at least partially within the liquid tank and has a flow path along which the blower air passes. In particular embodiments, the muffler can also provide a heat exchanger function, for example, to heat cleaning fluid provided to the extractor.

16 Claims, 13 Drawing Sheets

(56) References Cited

U.S. PATENT DOCUMENTS

| | | | | |
|---|---|---|---|---|
| 4,862,551 | A | 9/1989 | Martinez et al. | |
| 5,778,646 | A | 7/1998 | Pfisterer | |
| 6,052,861 | A | 4/2000 | Keller | |
| 6,076,597 | A | 6/2000 | Manning et al. | |
| 6,182,328 | B1 | 2/2001 | Roden | |
| 6,290,097 | B1 | 9/2001 | Oakley | |
| 6,675,437 | B1 | 1/2004 | York | |
| 7,159,271 | B2 | 1/2007 | Sepke et al. | |
| 7,841,042 | B2 | 11/2010 | Roden et al. | |
| 8,032,979 | B2 | 10/2011 | Boone | |
| 2007/0039724 | A1 | 2/2007 | Trumbower et al. | |
| 2007/0061996 | A1 * | 3/2007 | Boone | 15/321 |
| 2008/0184520 | A1 | 8/2008 | Wolfe et al. | |
| 2009/0094784 | A1 | 4/2009 | Pedlar et al. | |

* cited by examiner

SYSTEMS AND METHODS FOR TRANSFERRING HEAT AND/OR SOUND DURING FLUID EXTRACTION AND/OR CLEANING PROCESSES

CROSS-REFERENCE TO RELATED APPLICATION

The present application claims priority to U.S. Provisional Application No. 61/150,931, filed Feb. 9, 2009, and incorporated herein by reference.

TECHNICAL FIELD

The present disclosure is directed generally to systems and methods for transferring heat and/or sound during fluid extraction and/or cleaning processes, for example, processes performed using truck-mounted cleaning/extraction devices.

BACKGROUND

Existing commercial systems for cleaning flooring surfaces and/or extracting water from water-damaged buildings include truck or van based devices. These devices typically include a supply water tank that supplies clean, heated water and detergent to a handheld wand. An operator moves the wand over the floor while the wand directs the heated cleaning fluid over the floor and removes spent cleaning fluid and dirt from the floor. The devices typically include a waste tank that receives the post-cleaning fluid and dirt extracted by the wand. A pump pressurizes the water supplied to the wand, and a blower draws a vacuum on the waste tank so as to draw the waste water and dirt from the wand into the waste tank. The pump and blower can be driven by the vehicle's engine, or more typically, with a separate internal combustion engine carried by the vehicle.

One drawback with the foregoing approach is that it takes a considerable amount of energy to pressurize and heat the cleaning water and then remove it after cleaning. Accordingly, some existing devices use an arrangement of heat exchangers that extract heat from the vehicle engine, the separate internal combustion engine, and/or the blower to heat the water prior to cleaning. While these approaches have improved the overall efficiency of the cleaning/extraction devices, manufacturers are under continual pressure to further increase that efficiency. In addition, manufacturers are under pressure to reduce the noise produced by such devices, for example, when the devices are used in residential settings. Accordingly, there remains a need for improved water extraction and cleaning devices.

DETAILED DESCRIPTION

The present disclosure is directed generally to systems and methods for transferring heat and/or sound during fluid (e.g., liquid) extraction and/or cleaning processes. Specific details of several embodiments of the disclosure are described below with reference to particular, vehicle-based configurations. In other embodiments, aspects of the disclosure can include other arrangements. Several details describing structures or processes that are well-known and often associated with these types of systems are not set forth in the following description for purposes of brevity. Moreover, although the following description sets forth several embodiments of different aspects of the disclosure, several other embodiments can have different configurations and/or different components than those described in this section. Accordingly, the disclosure may have other embodiments with additional elements not described below with reference to FIGS. 1-12, and/or without several of the elements described below with reference to FIGS. 1-12.

Figure 1:
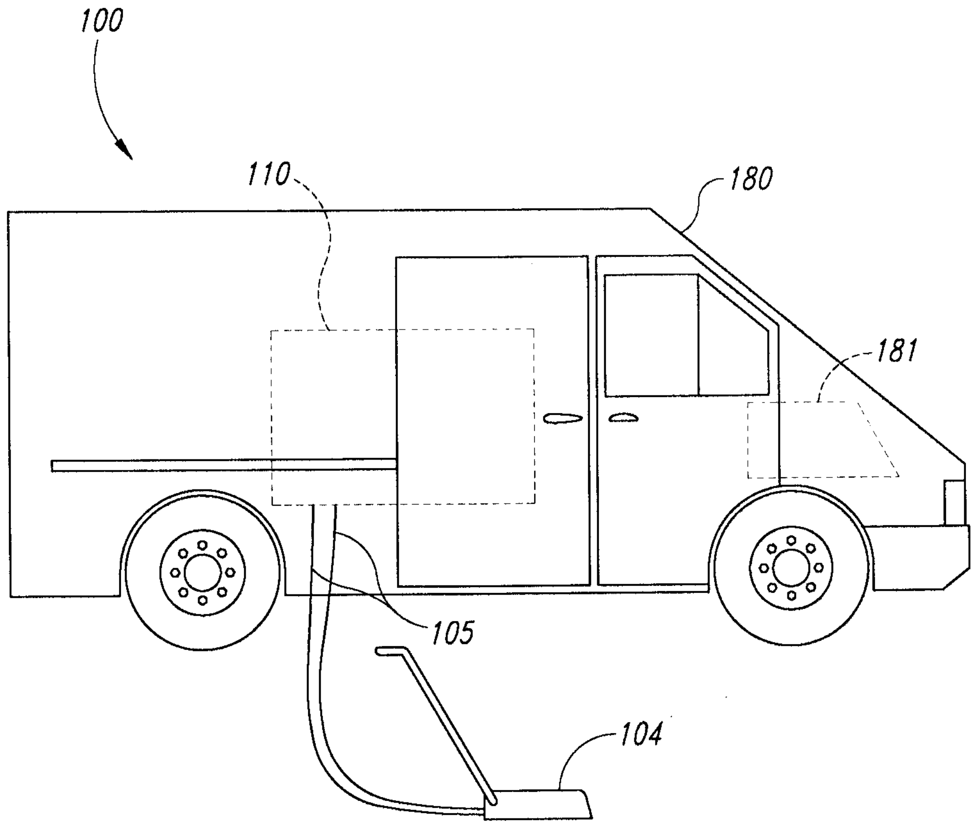
FIG. 1 is a partially schematic side view of a vehicle-based fluid cleaning and/or extraction system.

FIG. 1 is a partially schematic, side view of a system 100 that can be used to extract water or other fluids from a floor surface or other environment and, in at least some cases, clean the surface. In a particular aspect of this embodiment, the system 100 is vehicle-based and accordingly, includes a vehicle 180 that is propelled by a vehicle engine 181 and that carries a separate, on-board power system 110. The power system 110 is coupled to an extractor 104 with one or more fluid lines 105. During operation, a user runs the extractor 104 over a floor or other surface to remove water and/or other fluids. If the extractor 104 is also used for cleaning, the power system 110 supplies cleaning fluid to the extractor 104, in addition to removing the cleaning fluid from the extractor 104 via the fluid lines 105. The cleaning fluid typically includes heated water, and can optionally include other constituents, e.g., detergents, surfactants, and/or other additives.

Figure 2:
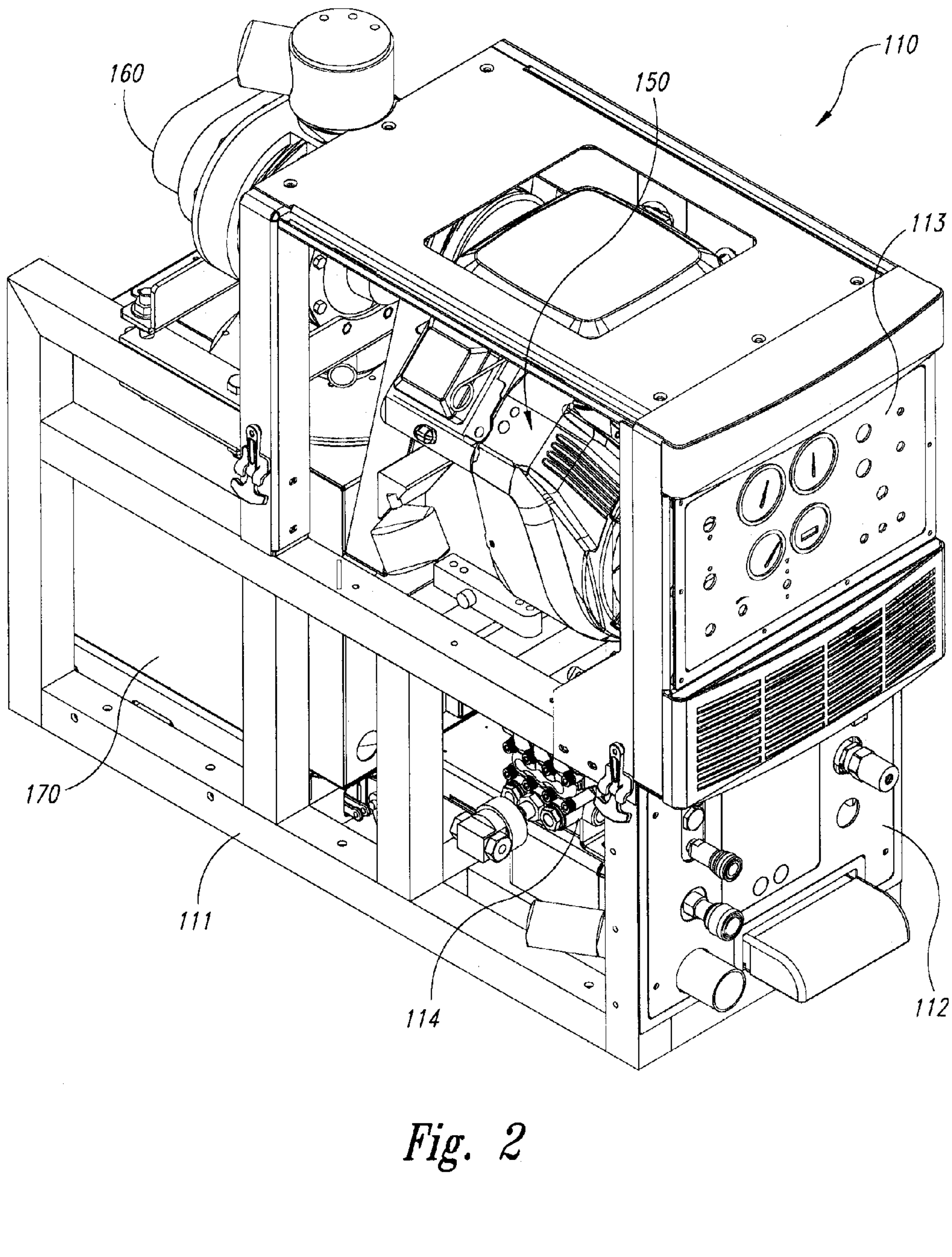
FIG. 2 is a partially schematic, isometric illustration of a power system configured to power devices used for cleaning and/or liquid extraction.

FIG. 2 is a partially schematic, isometric illustration of an embodiment of the power system 110 illustrating several major components. The power system 110 can include a frame 111 that carries an extraction engine 150. The extraction engine 150 can be a stand-alone engine (e.g., operating independently of the vehicle engine 181 shown in FIG. 1) and can include any of a variety of internal combustion or other suitable engines (e.g., two-stroke engines, four-stroke engines, diesel engines, and/or others). The extraction engine

150 powers a blower 160 that creates a vacuum for removing fluid via the extractor 104 (FIG. 1). When the extractor 104 is also used for cleaning, the extraction engine 150 powers a fluid pump 114 that draws fluid from a fluid supply tank 170 and provides pressurized fluid to the extractor 104. The power system 110 is controlled and monitored via a control/meter panel 113. A connection panel 112 is provided to support connections (e.g., hose connections) between the power system 110 and peripheral devices. The power system 110 is carried by the vehicle 180 (FIG. 1) so as to be fully operable once the hose connections are made.

Figure 3:
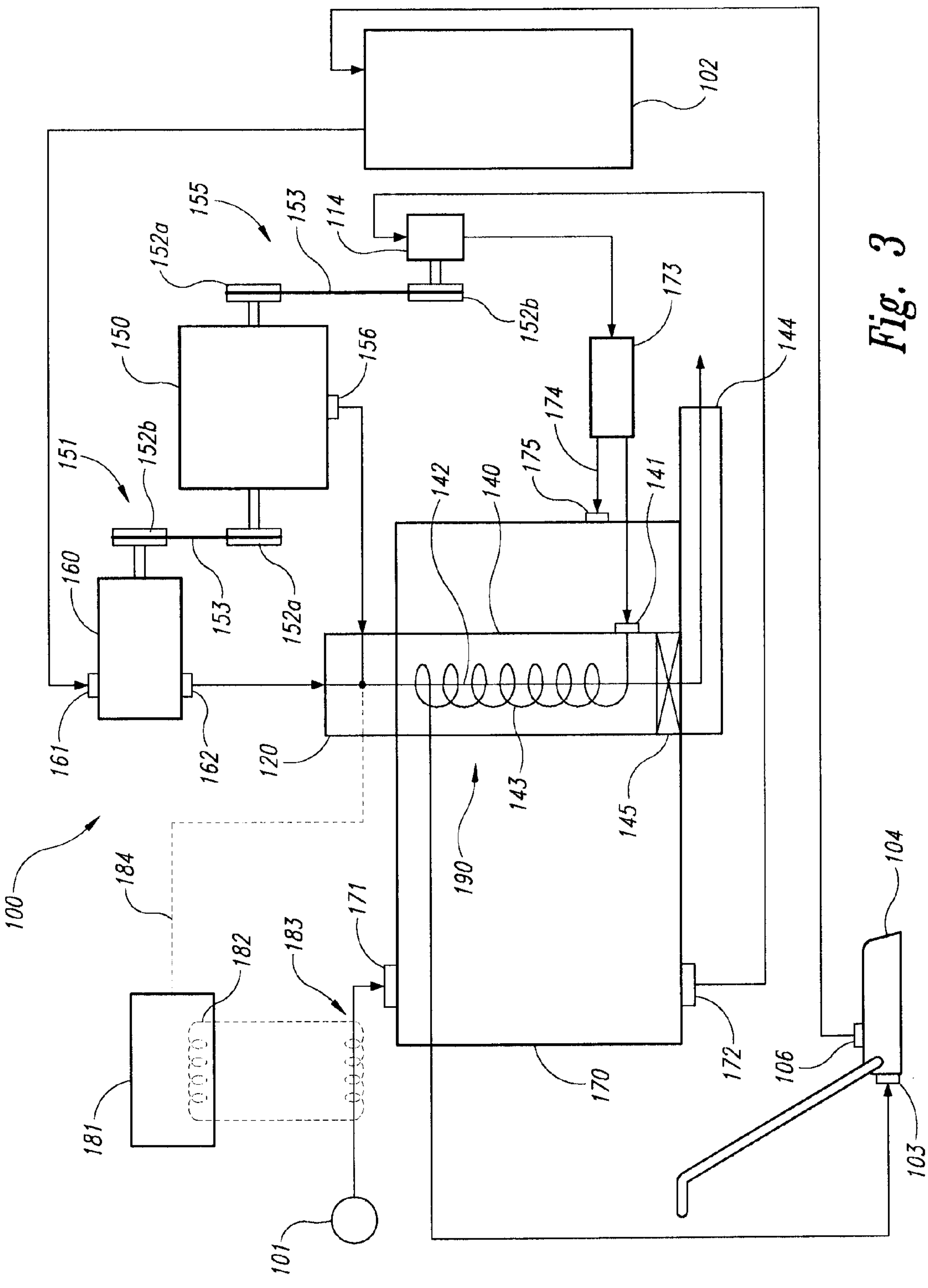
FIG. 3 is a block diagram illustrating components of a system in accordance with an embodiment of the disclosure.

FIG. 3 is a schematic block diagram illustrating the functional organization and operation of an embodiment of the system 100 described above with reference to FIGS. 1 and 2. In the embodiment shown in FIG. 3, the system 100 can be used for cleaning (e.g., via fluid delivery and extraction) or fluid extraction alone. In other embodiments described later with reference to FIG. 8, the system 100 may be configured exclusively for fluid extraction.

Fluid (e.g., water and/or another liquid) is introduced into the system 100 from a fluid source 101, for example, a household garden hose connection. The fluid flows from the fluid source 101 into the fluid supply tank 170 via a low pressure fluid inlet 171. Optionally, the fluid entering the fluid supply tank 170 can be pre-heated with a vehicle heat exchanger 183 that receives heat from a vehicle heater core 182 in the vehicle engine 181. Fluid is stored in the fluid supply tank 170 and is withdrawn from the fluid supply tank 170 via a low pressure fluid outlet 172. The low pressure fluid withdrawn from the supply tank 170 is pressurized by the fluid pump 114 and is provided to a regulator 173. When the extractor 104 is actively receiving and delivering pressurized fluid (during a cleaning process), the regulator 173 directs the pressurized fluid to a high pressure fluid inlet 141 at the entrance of a heat exchanger 140. The fluid passes through the heat exchanger 140 along a fluid flow path 143, and then to the extractor 104. When the extractor 104 is not actively receiving and delivering pressurized fluid, the regulator 173 returns the pressurized fluid to the fluid supply tank 170 via a bypass line 174 and an associated bypass inlet 175 at the fluid supply tank 170.

During cleaning processes, fluid is provided to the extractor 104 via an inlet 103. During cleaning and extraction processes, waste fluid is removed from the extractor 104 via an outlet 106 and is delivered to a waste fluid tank 102. The blower 160 draws a vacuum on the waste fluid tank 102 to provide the pressure differential required to remove the waste fluid from the extractor 104 and direct it into the waste fluid tank 102. Accordingly, the blower 160 includes an internal compression device, e.g., an impellor, a fan or a series of fans, an intake 161 upstream of the fan(s) and an outlet 162 downstream of the fan(s). The blower 160 is driven by the extraction engine 150 via a blower transmission 151. In a particular embodiment shown in FIG. 3, the blower transmission 151 includes an arrangement of pulleys 152*a*, 152*b* and one or more belts 153. A pump transmission 155 provides power to the fluid pump 114 and can include a generally similar arrangement of pulleys 152*a*, 152*b* and one or more belts 153. In other embodiments, other transmission mechanisms (e.g., hydraulic fluid devices or gear trains) can be used to provide power to the fluid pump 114 and/or the blower 160.

The air drawn and pressurized by the blower 160 is heated as a result of being compressed, for example, to a temperature of from about 400° F. to about 500° F. The compressed, heated air is provided to the heat exchanger 140 to heat the fluid passing along the fluid flow path 143. In a particular embodiment, the blower air is mixed with exhaust gas (e.g., combustion products) directed from an exhaust outlet 156 of the extraction engine 150 to a gas inlet manifold 120. The gas mixture is then provided to the heat exchanger 140 where it flows along a gas flow path 142 to a gas path exit 144. A diverter valve 145 can be used to divert the gas flow away from the fluid flow path 143, as is described later with reference to FIG. 5. The temperature of the exhaust gas ranges from about 600° F. to about 1300° F. in particular embodiments, and can have other values in other embodiments. Optionally, the heat exchanger 140 can receive additional heat from exhaust produced by the vehicle engine 181 via a vehicle exhaust path 184.

In any of the foregoing embodiments, the gas provided to the heat exchanger 140 heats the pressurized fluid passing along the fluid flow path 143 to a temperature suitable for cleaning (e.g., in the range of about 200° F. to about 240° F.). In addition, the heat exchanger 140 can be positioned within the fluid supply tank 170. This can provide further benefits, in addition to heating the fluid passing along the fluid flow path 143. For example, by positioning the heat exchanger 140 in the fluid supply tank 170, the heat exchanger 140 can transfer heat to the fluid in the fluid supply tank 170, effectively preheating the fluid before it passes through the pump 114 and along the fluid flow path 143. In a particular embodiment, the fluid can be pre-heated by about 10°-15° F., and in other embodiments, the fluid can be heated by other values. For example in other embodiments, the fluid can be pre-heated by 20° F. or more. In addition to or in lieu of this feature, the fluid present in the fluid supply tank 170 (which can be generally quiescent) can absorb, attenuate, and/or dampen noise associated with the air pressurized by the blower 160. Accordingly, internal features of the heat exchanger 140 and/or the interface between the heat exchanger 140 and the fluid supply tank 170 can operate as a muffler 190. Further details of this arrangement are described below with reference to FIGS. 4 and 5.

Figure 4:
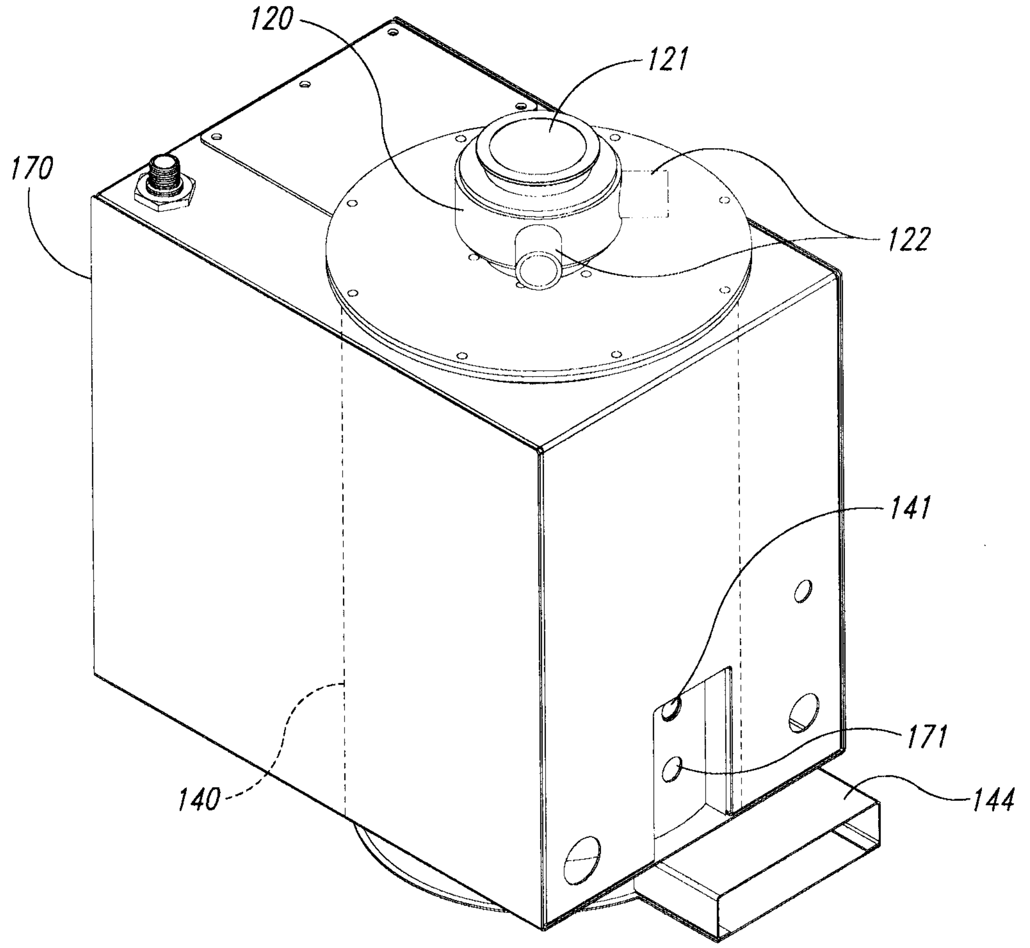
FIG. 4 is a partially schematic, isometric illustration of a fluid supply tank having a heat exchanger/muffler installed in accordance with an embodiment of the disclosure.

FIG. 4 is a partially schematic, isometric illustration of an embodiment of the fluid tank 170. The fluid tank 170 has a generally rectangular cross-sectional shape in the illustrated embodiment, and can have other shapes in other embodiments. The gas inlet manifold 120 extends outside the fluid supply tank 170 and provides gas to the heat exchanger 140 within the fluid supply tank 170. Accordingly, the gas inlet manifold 120 can include a blower air inlet 121 that receives heated, pressurized air from the blower 160 (FIG. 3) and can optionally include one or more engine exhaust inlets 122 that receive combustion products from the extraction engine 150 (FIG. 3). In a particular embodiment in which the extraction engine 150 has two exhaust pipes (e.g., when the extraction engine 150 has two cylinders or two banks of cylinders), the gas inlet manifold 120 can include two engine exhaust inlets 122, as shown in FIG. 4. The heated gas passes through the heat exchanger 140 and exits via the gas path exit 144. Additional conduits directing the gas away from the fluid supply tank 170 and the vehicle in which it is positioned are not shown in FIG. 4 for purposes of illustration. The fluid supply tank 170 can also include a low pressure fluid inlet 171 that receives fluid from the fluid source 101 (FIG. 3) and a high pressure fluid inlet 141 that receives pressurized fluid from the fluid pump 114 (FIG. 3). Other fluid attachments and couplings are not shown in FIG. 4 for the sake of simplicity.

Figure 5:
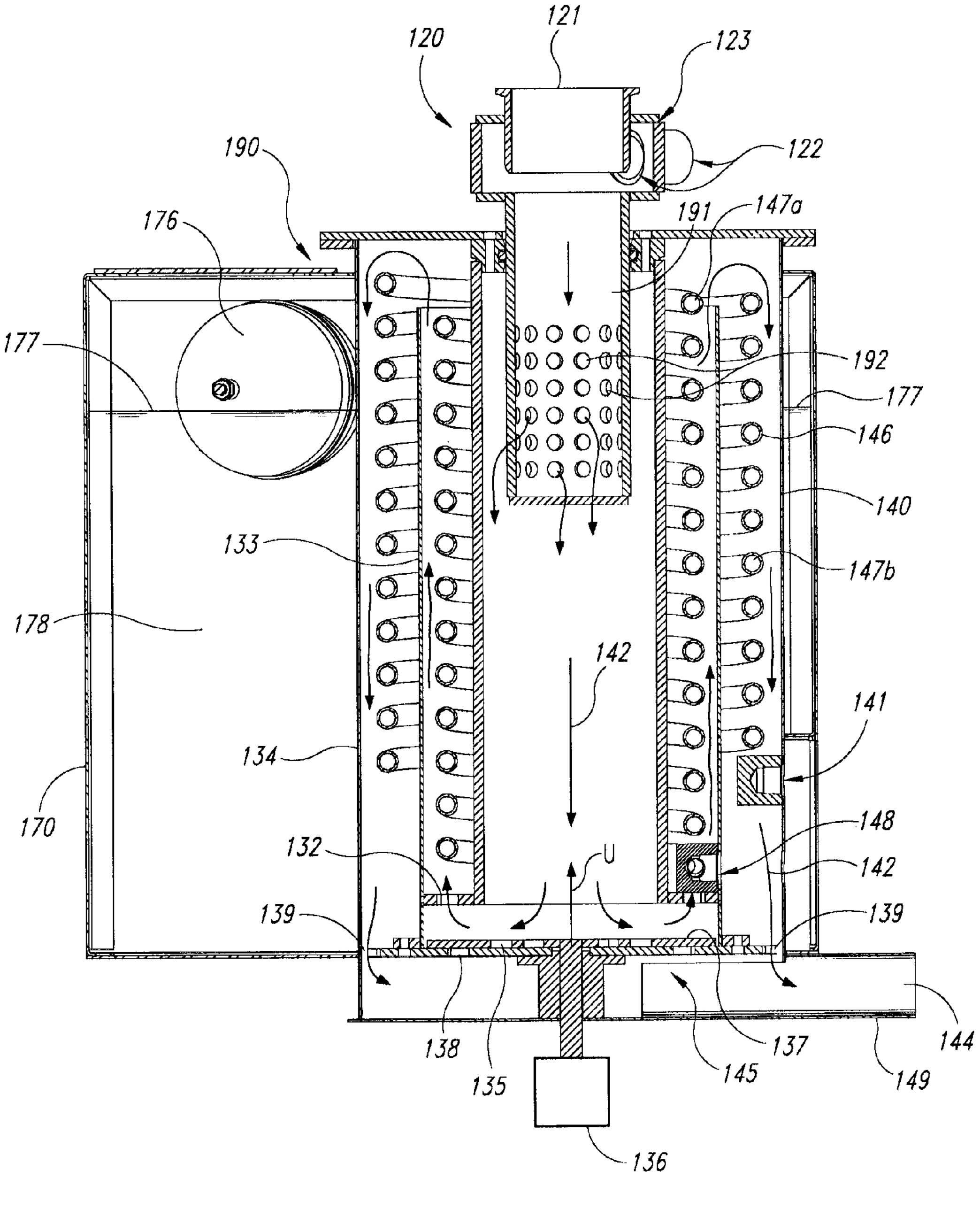
FIG. 5 is a partially schematic, cross-sectional illustration of the fluid supply tank shown in FIG. 4.

FIG. 5 is a partially schematic, cross-sectional illustration of the fluid supply tank 170 and the heat exchanger 140/muffler 190 described above. The fluid supply tank 170 can include a float valve 176 that regulates a fluid level 177 in the tank 170. As will be described later, it may be desirable to keep the fluid level 177 high, even if the system 100 is being used only for fluid extraction.

The heat exchanger 140 can be positioned within the tank 170 so that it is partially or completely surrounded by or immersed in a fluid jacket formed by the fluid within the tank 170. For example, the heat exchanger 140 can have a generally cylindrical sidewall that is surrounded on all sides by fluid in the tank 170, except for a region where hose connections provide fluid communication with the region external to the heat exchanger 140. In a particular aspect of this embodiment, high pressure fluid is provided to the internal core of the heat exchanger 140 via the high pressure inlet 141 and is directed to a spiral-shaped conduit 146. The conduit 146 can include external fins, protrusions, and/or other features (not visible in FIG. 5) to enhance heat transfer with the adjacent hot gas. The conduit 146 can have a two-pass coil arrangement with an inner spiral 147*a* and an outer spiral 147*b*. In a particular aspect of this embodiment, the high pressure fluid passes first through the outer spiral 147*b* and then to the inner spiral 147*a*. The resulting heated fluid is removed from the heat exchanger 140 via a high temperature outlet 148.

Hot gas enters the heat exchanger 140 from the manifold 120, which can include a silencer 123 to reduce noise at this location. The hot gas then passes through an elongated muffler conduit 191. The muffler conduit 191 can include perforations 192 that act to attenuate the sound associated with the high pressure, heated gas. The muffler 190 can include other treatments in addition to this feature, for example, vertical fiberglass tubes positioned within the heat exchanger 140 generally concentrically with the muffler conduit 191, within, between, or outside the spirals 147*a*, 147*b*. Optionally, the muffler 190 can include other suitable sound-absorbing materials (e.g., lead-based materials and/or high temperature rubber materials) for deadening the sound created by the high temperature, high pressure gas. The gas is directed along the gas flow path 142 through the muffler conduit 191 and toward the bottom of the heat exchanger 140, then upwardly past the inner spiral 147*a*, then downwardly past the outer spiral 147*b*. At the base of the heat exchanger 140, the hot gas passes through entrance holes 139 into an exit tube 149. The gas then passes to the gas path exit 144.

In a particular embodiment, the diverter valve 145 can be actuated to bypass the heated gas away from the fluid conduit 146. This mode of operation may be used when there is no need to heat the fluid in the conduit 146, for example, when the fluid delivery/cleaning feature of the system 100 is not in use, but the fluid extraction capability of the system 100 is in use. The diverter valve 145 can include a diverter plate 137 connected to a diverter actuator 136 (shown schematically in FIG. 5) that moves the diverter plate 137 from the open position shown in FIG. 5 to a closed position. In the closed position, the diverter plate 137 moves upwardly as indicated by arrow U. In this configuration, the diverter plate 137 blocks access holes 132 that would otherwise allow the heated gas to pass over the inner spiral 147*a*, and opens a path between plate bypass holes 135 in the diverter plate 137 and corresponding exit tube bypass holes 138 in the exit tube 149. In this position, the diverter valve 145 allows the gas to pass directly into the exit tube 149 without passing over the inner spiral 147*a* and the outer spiral 147*b*. In other embodiments, the diverter valve 145 can have other configurations, e.g., a butterfly valve configuration, or a ball valve configuration. In particular embodiments, the diverter valve can be powered by the vacuum forces produced by the blower 160 (FIG. 3) and controlled in accordance with signals received from a thermostat or other temperature sensor.

In addition to transferring heat to fluid in the conduit 146 and/or muffling sound via the muffler conduit 191, the arrangement shown in FIG. 5 can also transfer heat and/or sonic energy to the fluid within an interior volume 178 of the fluid supply tank 170. Accordingly, the heat exchanger 140 can have a thin and/or otherwise heat transmissive heat exchanger wall 134 that has a substantial amount of surface area in contact with fluid in the interior volume 178. The heat exchanger wall 134 can include fins, protrusions, dimples, and/or other features that enhance this heat transfer. In addition, the heat exchanger wall 134 can transmit sonic energy to the fluid within the interior volume 178, and the sound associated with the gas passing along the gas path 142 can be further attenuated via the baffling effect provided by the inner and outer spirals 147*a*, 147*b*, and a baffle wall 133 positioned between the two spirals 147*a*, 147*b*. It is expected that this arrangement can reduce the sound level produced by the hot, pressurized gas, relative to the sound levels associated with conventional systems. For example, a typical existing blower produces noise at a level of around 120 dB. In particular embodiments of the present disclosure, the system can reduce noise levels to less than 90 dB, less than 85 dB, or other ranges. It is expected that in certain embodiments of the present disclosure, the sound level will be reduced due to sound attenuation within the heat exchanger 140 and/or due to sound attenuation provided by the liquid in the fluid supply tank 170. Accordingly, it may be desirable to ensure that water within the fluid supply tank 170 has a fluid level 177 that is sufficient to provide sound attenuation, even if the fluid supply tank 170 is not being used to supply cleaning fluid (e.g., if the system 100 is being used solely for fluid extraction). In still further aspects of the foregoing embodiments, the sonic energy transmitted to and absorbed by the fluid in the fluid supply tank 170 can also increase the temperature of the fluid in the fluid supply tank 170.

Figure 6:
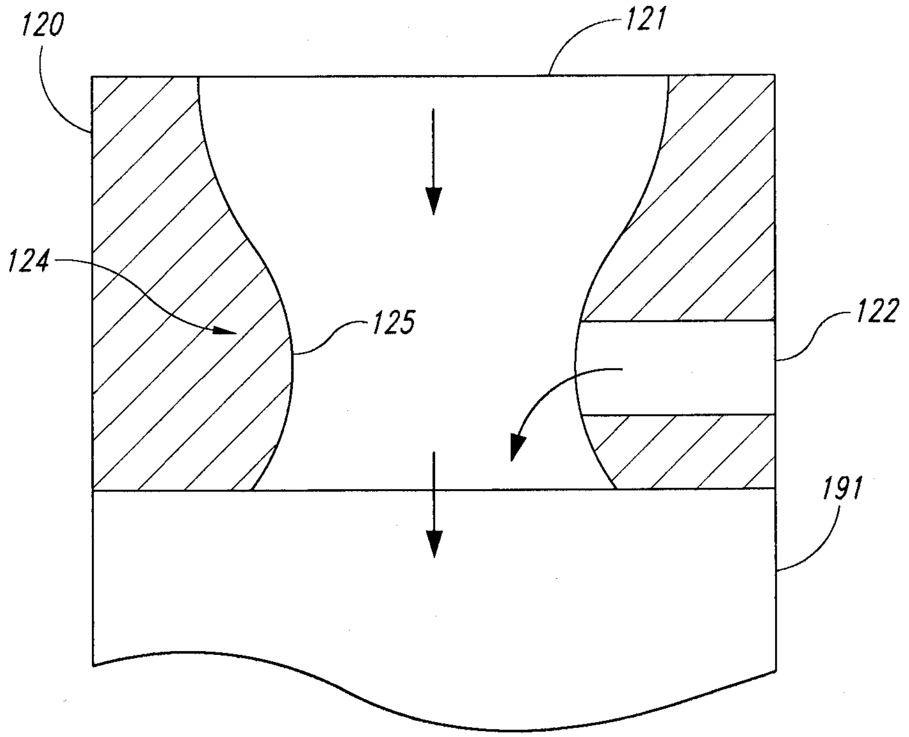
FIG. 6 is a schematic illustration of a gas inlet manifold configured in accordance with an embodiment of the disclosure.

FIG. 6 is a partially schematic, isometric illustration of an embodiment of the inlet manifold 120 described above. In this particular embodiment, hot blower air introduced at the blower inlet 121 passes through a venturi 124 having a narrowed throat 125. Engine exhaust gas received at the engine exhaust inlet 122 is provided to the venturi 124 via an aperture located at or near the throat 125. The engine exhaust gas is mixed with the blower air downstream of the throat 125 and/or as it passes into the muffler conduit 191. It is expected that this arrangement will reduce the likelihood for the high pressure blower air to create an undesirable back pressure on the engine exhaust. In particular, by locally reducing the pressure of the blower air at the throat 125 and drawing the exhaust gas into the manifold 120 at this region, the likelihood for high exhaust back pressure can be reduced.

Figure 7:
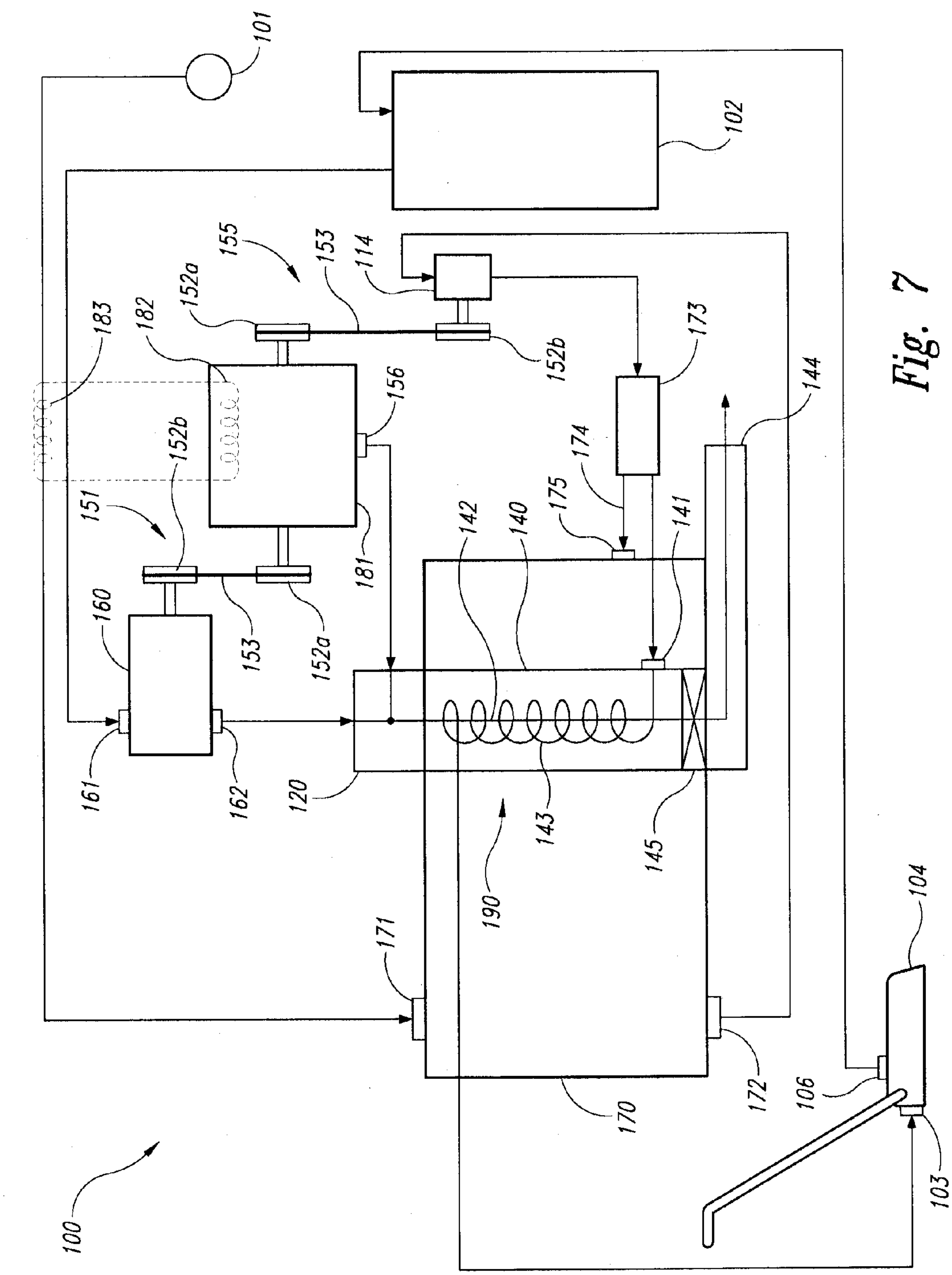
FIG. 7 is a block diagram illustrating components of a system in accordance with another embodiment of the disclosure.

In an embodiment of the disclosure described above with reference to FIG. 3, a separate extraction engine 150 provides power to the blower 160 and the pump 114. In other embodiments, the vehicle engine 181 can provide this function. For example, FIG. 7 is a schematic block diagram illustrating an arrangement of the system 100 in which the vehicle engine 181 powers the blower 160 and the pump 114, eliminating the need for a separate extraction engine 150. Such an arrangement can be used when it is convenient and/or otherwise desirable to extract power from the vehicle engine 181 rather than providing a separate extraction engine 150. Other aspects of the system 100 can be generally similar to those described above with reference to FIG. 3.

Figure 8:
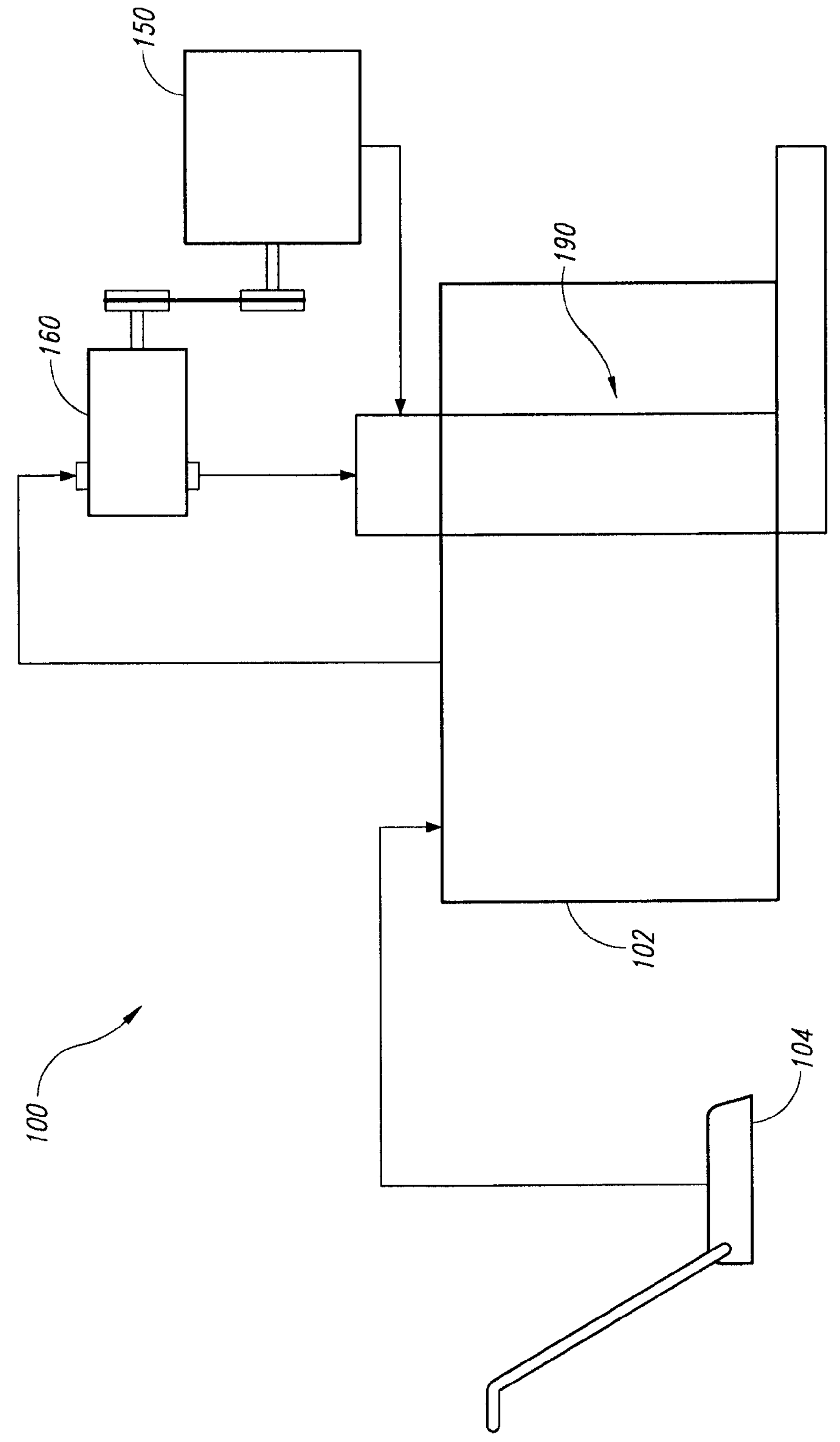
FIG. 8 is a schematic block diagram illustrating components of a system configured primarily to extract liquid in accordance with still another embodiment of the disclosure.

FIG. 8 is a schematic block diagram illustrating a system 100 configured in accordance with still another embodiment of the disclosure. In this embodiment, the extractor 104 operates exclusively as a fluid extractor, and accordingly, does not receive cleaning fluid. Instead, the extractor 104 can be used to withdraw water from a flooded or otherwise soaked or inundated building. In this arrangement, the system 100 need not include a heat exchanger because there is no need for providing heated cleaning fluid to the extractor 104. However, the system can still include a muffler 190 positioned within a fluid tank and having features generally similar to those described above. In a particular aspect of this embodiment, the fluid supply tank 170 described above can also be eliminated and accordingly, the muffler 190 can be positioned in the waste fluid tank 102. Accordingly, the sound attenuation function described above with reference to the fluid in the fluid supply tank 170 can instead be provided by waste fluid in the waste fluid tank 102.

FIGS. 9-12 illustrate another aspect of the power system 110 initially shown in FIGS. 1 and 2, in accordance with another embodiment of the disclosure. In a particular aspect of this embodiment, the power system 110 can include features that cool the transmission 151 used to drive the blower 160. This arrangement can have particular utility when the transmission 151 includes belts and pulleys, but can also apply to other transmissions as well.

Figure 9:
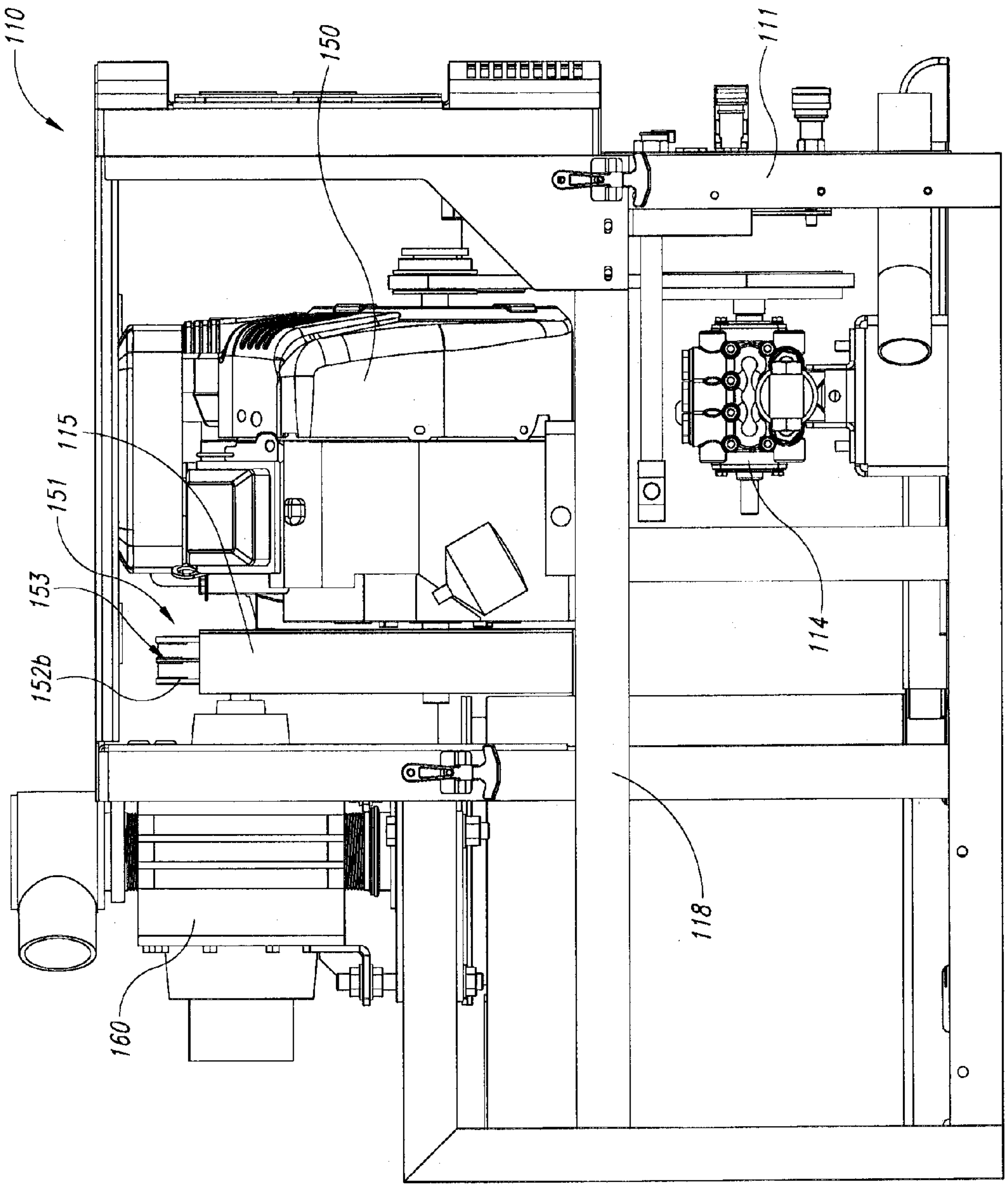
FIG. 9 is a partially schematic, side elevational illustration of a power system having a frame configured in accordance with an embodiment of the disclosure.

Beginning with FIG. 9, the power system 110 includes a frame 111 that can be formed from connected sections of hollow conduit 118. The conduit 118 can have a rectangular cross-sectional shape in an embodiment shown in FIG. 9, and can have other cross-sectional shapes in other embodiments. In any of these embodiments, the hollow or at least partially hollow nature of the conduit 118 can be used to direct cooling gas to the blower transmission 151 and in particular, to components located within a shroud 115.

Figure 10:
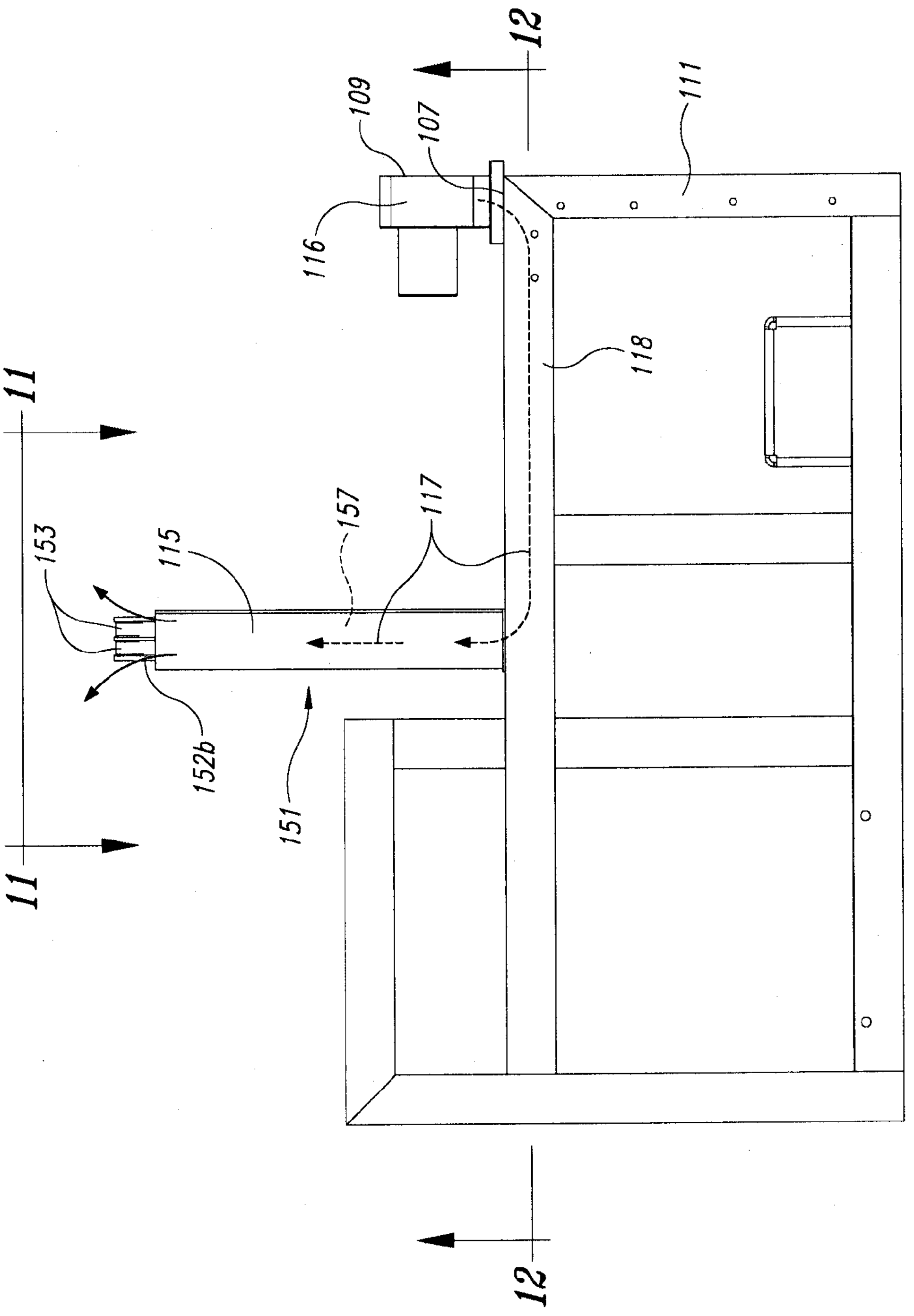
FIG. 10 is a partially schematic, simplified illustration of the frame shown in FIG. 9.

FIG. 10 is a partially schematic, side elevation view of the frame 111 and selected features associated with cooling the blower transmission 151. The arrangement can include a gas driver 116 having a cooling gas inlet 109. The gas driver 116 can include a blower or other device that receives relatively cool air (e.g., ambient air) and directs it through a frame opening 107 into the conduit 118 forming the frame 111. The air or other gas passes along a cooling gas flow path 117 and is directed into an interior volume 157 within the shroud 115. The shroud 115 is positioned around or partially around the pulleys and belts forming the blower transmission 151. The air passes over the blower transmission 151 and exits the shroud at a cooling gas outlet 108.

Figure 11:
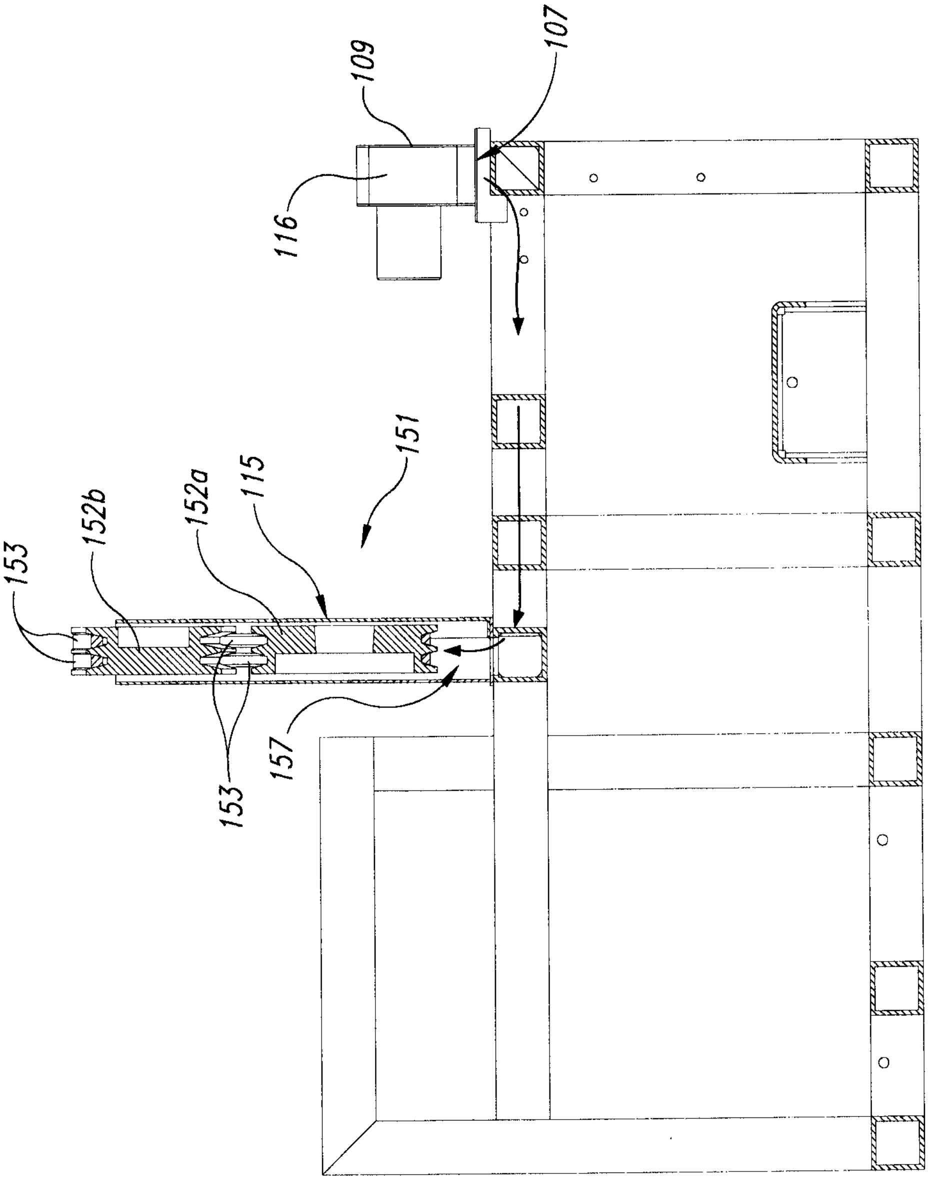
FIG. 11 is a partial cross-sectional illustration of the frame taken substantially along line 11-11 of FIG. 10.

FIG. 11 is a partial cross-sectional view taken substantially along line 11-11 of FIG. 10 and illustrating features of the blower transmission 151 within the interior volume 157 enclosed by the shroud 115. These features can include the engine pulley 152*a*, the blower pulley 152*b*, and one or more belts 153 (two are shown in FIG. 11) passing over the pulleys 152*a*, 152*b*. The cooling gas is directed over both pulleys 152*a*, 152*b* and the belts 153 to cool these components.

Figure 12:
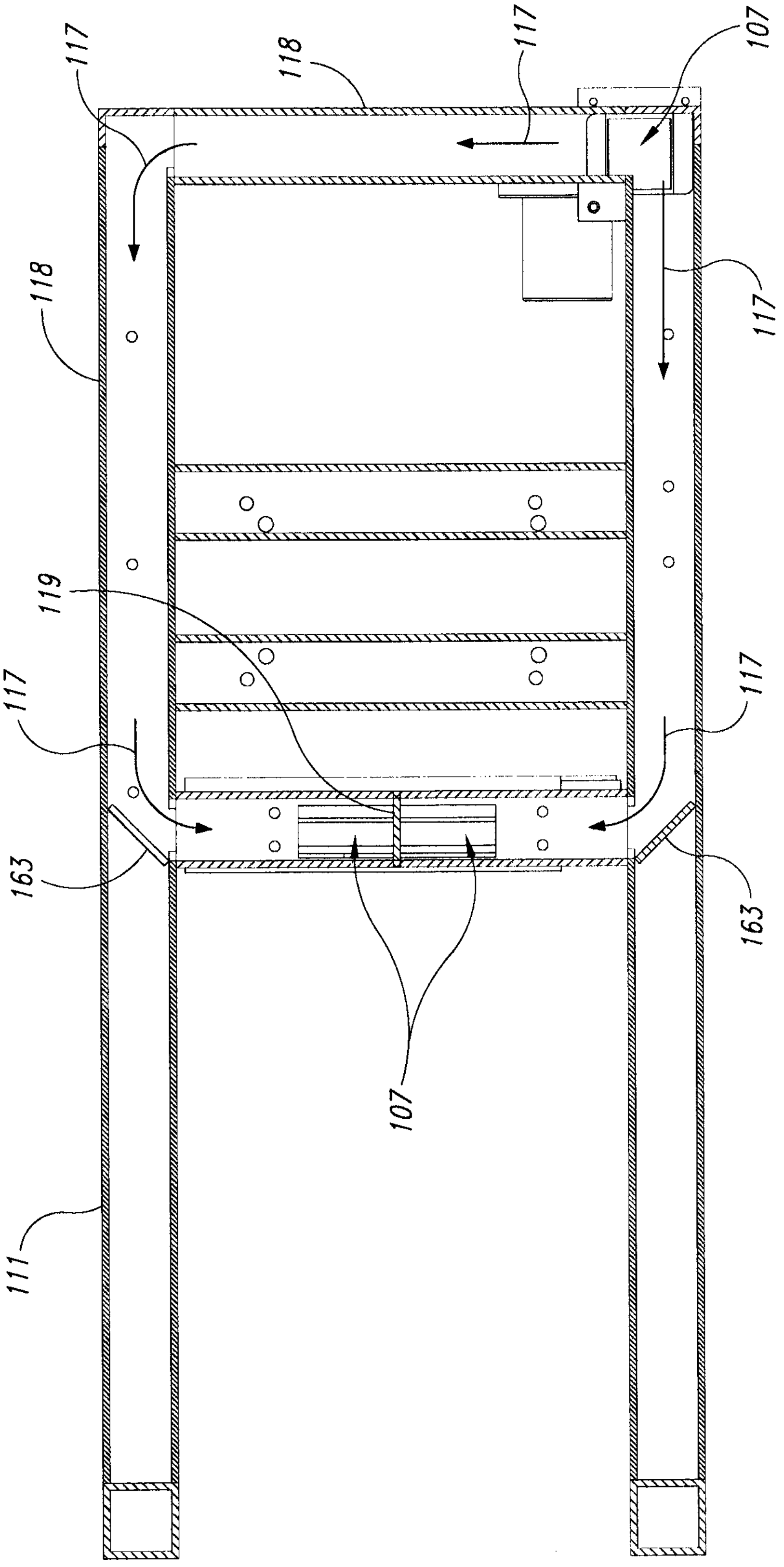
FIG. 12 is a cross-sectional illustration of a portion of the frame taken substantially along line 12-12 of FIG. 10.

FIG. 12 is a partially schematic, cross-sectional view of the frame 111 taken substantially along line 12-12 of FIG. 10. FIG. 12 illustrates the cooling gas path 117, which can include two segments passing through different portions of the hollow conduit 118 from the frame opening 107. The frame 111 can include internal blockers 163 to direct the cooling flow away from the sections of conduit 118 that do not form part of the desired cooling gas flow path 117. A divider 119 positioned beneath the shroud 115 (FIG. 11) directs the air upwardly through additional frame openings 107 into the volume 157 (FIG. 11) surrounded by the shroud 115. One expected benefit of this arrangement is that it can reduce the temperature of the components included in the blower transmission 151 and in particular, the belts 153. By reducing the temperature of the belts 153, the belts 153 are expected to last longer, thereby reducing the time and expense associated with routine maintenance of the system 100.

Figure 13:
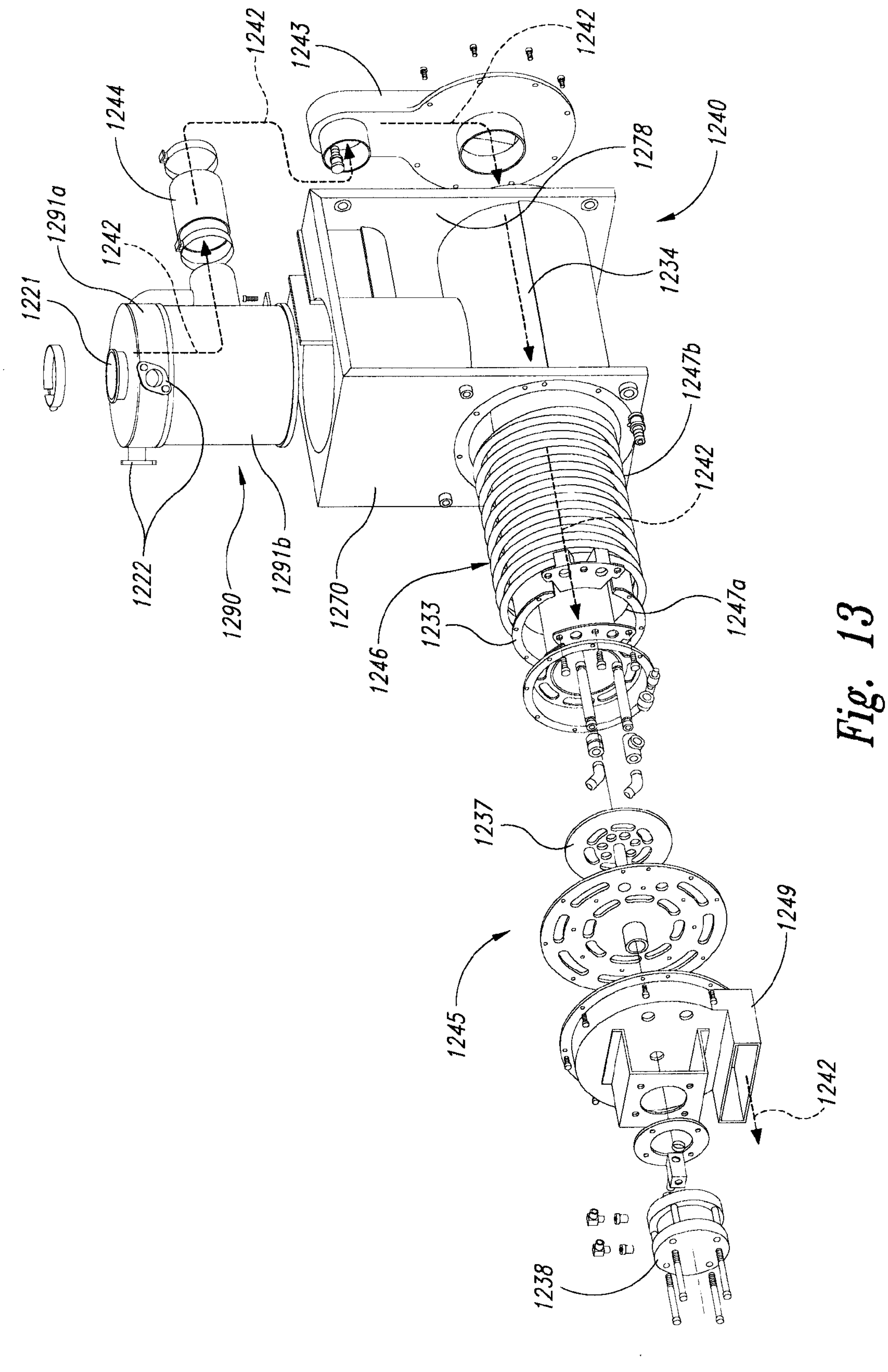
FIG. 13 is a partially exploded isometric illustration of a fluid supply tank configured in accordance with another embodiment of the disclosure.

FIG. 13 is a partially schematic, partially exploded isometric illustration of a tank 1270 having a heat exchanger 1240 and muffler 1290 configured in accordance with another embodiment of the disclosure. The muffler 1290 can include a first portion 1291*a* that receives exhaust gas via one or more exhaust inlets 1222 (two are shown in FIG. 13). The muffler 1290 can further include a second portion 1291*b* that receives blower air via a blower air inlet 1221. The flow of exhaust gas and blower air is mixed in the muffler 1290 and directed along a gas flow path 1242 through an exit conduit 1244. An end piece 1243 located at the distal end of the tank 1270 redirects the flow of gas into a horizontally or laterally oriented heat exchanger 1240. The gas then passes through a diverter valve 1245 having a diverter plate 1237 coupled to a diverter actuator 1238. The diverter valve 1245 can operate in a manner generally similar to that discussed above with reference to the diverter valve 145 shown in FIG. 5. With the diverter valve 1245 in one position, the gas is directed back through the heat exchanger 1240. The heat exchanger 1240 can include elements generally similar to those discussed above with reference to the heat exchanger 140 shown in FIG. 5. For example, the heat exchanger 1240 can include a spiral conduit 1246 with inner and outer spirals 1247*a*, 1247*b* that are separated by a baffle wall 1233. The gas within the heat exchanger 1240 passes over each of the inner and outer spirals 1247*a*, 1247*b* in turn. The gas then passes through an exit tube 1249 where it is collected and disposed of. Accordingly, the overall operation of the arrangement shown in FIG. 13 is generally similar to that discussed above with reference to the arrangement shown in FIG. 5; however, the heat exchanger 1240 is positioned laterally within the tank 1270, and the muffler 1290 includes multiple portions, one positioned to attenuate noise associated with the exhaust gas, and the other positioned to attenuate noise associated with the blower air. As discussed above with reference to FIG. 5, the heat exchanger can further attenuate sound and heat the water within an interior volume 1278 of the tank 1270. In at least some embodiments, it is expected that the horizontal or lateral arrangement of the heat exchanger 1240 will allow easier access to the heat exchanger 1240 for cleaning and/or other maintenance activities.

From the foregoing, it will be appreciated that specific embodiments of the disclosure have been described herein for purposes of illustration, but that various modifications may be made without deviating from the disclosure. For example, the heat exchanger and muffler arrangements described above may have different features, arrangements, and/or elements than those explicitly described above and shown in the Figures. In particular embodiments, the heat exchanger can include more than two concentric coils, fewer than two concentric coils, or an arrangement that does not include coils at all. The extractor can include a hand-held wand, or, in other embodiments, a self-propelled "rider" device, or another device. The fluids provided and/or extracted by the system generally include liquids (e.g., water), but in some cases may also include gases. For example, during the fluid extraction, the system may entrain and extract air in addition to water, or the system may be used to extract liquids other than water. The heated gas provided to the heat exchanger may be obtained from sources other than those explicitly identified in the Figures, e.g., from a flow of engine cooling air. In still further embodiments, the system can include a muffler that transmits heat and vibrational (e.g., sound) energy directly to fluid in the fluid tank, without the need for a high pressure fluid flow path (e.g., the spiral conduit). This arrangement can be used in the embodiment described above for which the system provides no heated cleaning fluid, or an embodiment in which the heat transfer rate to fluid in the fluid tank is sufficient to heat the fluid to a desired temperature for cleaning. The transmission cooling arrangement described above in the context of the blower transmission can be applied to other system transmissions (e.g., the fluid pump transmission) in other embodiments.

Certain aspects of the disclosure described in the context of particular embodiments may be combined or eliminated in other embodiments. For example, aspects of the muffler and heat exchanger described in the context of FIG. 5 may be applied to arrangements shown in FIGS. 7 and 8, in addition to the arrangement shown in FIG. 3. Further, while advantages associated with certain embodiments have been described in the context of those embodiments, other embodiments may also exhibit such advantages, and not all embodiments need necessarily exhibit such advantages to fall within the scope of the disclosure. Accordingly, the disclosure can include other embodiments not expressly shown or described above.

I claim:

1. A fluid extraction system, comprising:

a fluid extractor having an inlet positioned to receive pressurized cleaning fluid, and an outlet positioned to deliver extracted waste fluid;

a fluid supply tank coupled to the extractor to provide the cleaning fluid;

a waste fluid tank coupled to the extractor to receive the extracted waste fluid;

a blower having an air intake and an air outlet through which blower air passes, the blower being operatively coupled to the extractor outlet to draw the extracted waste fluid from the extractor; and a heat exchanger positioned at least partially within the fluid supply tank, the heat exchanger having a first flow path coupled to the fluid supply tank to receive cleaning fluid, the heat exchanger further having a second flow path coupled to the blower air outlet to receive blower air, the first and second flow paths being in thermal communication with each other, the heat exchanger being in thermal communication with an interior region of the fluid supply tank.

2. The system of claim 1, further comprising a motor vehicle carrying the fluid supply tank, the waste fluid tank, the blower, and the heat exchanger together in an operable configuration.

3. The system of claim 2 wherein the motor vehicle includes a propulsion engine, and wherein the propulsion engine is coupled to the blower to power the blower.

4. The system of claim 2 wherein the motor vehicle includes a first, propulsion engine, and wherein the system further comprises a second engine coupled to the blower to power the blower.

5. The system of claim 1, further comprising a pump coupled between the fluid supply tank and the extractor to pressurize cleaning fluid provided to the extractor.

6. The system of claim 1, further comprising:

an engine coupled to the blower to drive the blower; and an exhaust conduit coupled to the engine to remove exhaust products from the engine, the exhaust conduit being coupled to the second flow path of the heat exchanger to direct the exhaust products along the second flow path.

7. The system of claim 1, further comprising:

a structural frame formed at least in part from hollow conduit, the conduit forming a cooling gas flow path having an inlet and an outlet;

an engine carried by the frame and coupled to the blower with a power transmission;

a shroud positioned around a volume that includes the power transmission, wherein the cooling gas flow path is positioned to direct gas into the volume; and a gas driver positioned in fluid communication with the inlet to direct gas through the conduit to the outlet.

8. The system of claim 1, further comprising:

a muffler positioned at least partially within the fluid tank, the muffler having a flow path along which the blower air passes.

9. The system of claim 8 wherein the flow muffler forms a portion of the heat exchanger.

10. The system of claim 1, further comprising:

a structural frame formed at least in part from hollow conduit, the conduit forming a cooling gas flow path having an inlet and an outlet;

an engine carried by the frame and coupled to the blower with a power transmission;

a shroud positioned around a volume that includes the power transmission, wherein the cooling gas flow path is positioned to direct gas into the volume; and a gas driver positioned in fluid communication with the inlet to direct gas through the conduit to the outlet.

11. The system of claim 1, further comprising:

a waste tank coupled to the fluid extractor to receive the waste fluid; wherein the first flow path includes an inner spiral conduit connected to an outer spiral conduit positioned around the inner spiral conduit, further wherein the heat exchanger includes a cylindrical wall positioned around the outer spiral conduit, the wall having an inner surface facing toward the outer spiral conduit and an outer surface facing toward and in thermal communication with an interior volume of the water supply tank; and wherein the system further comprises a diverter valve positioned along the second flow path, the diverter valve having a first position in which blower air passes over the first and second spiral conduits, and a second position in which the blower air is directed out of the heat exchanger without passing over the first and second spiral conduits.

12. The system of claim 11, further comprising heat transfer features positioned at the outer surface of the cylindrical wall to increase a heat transfer surface area of the wall.

13. The system of claim 10 wherein the transmission includes:

a first pulley carried by the engine;

a second pulley carried by the blower; and a belt connecting the first and second pulleys to transfer power from the engine to the blower.

14. The system of claim 1, further comprising:

a combustion engine coupled to the blower to drive the blower, the combustion engine having an exhaust outlet positioned to direct combustion exhaust products from the engine; and a heat exchanger manifold having a first inlet coupled to the blower outlet and a second inlet coupled to the exhaust outlet, the manifold further including a venturi through which the blower air is directed, the venturi having a reduced cross-sectional area throat with an aperture through which the combustion exhaust products are directed, wherein the manifold is coupled to the heat exchanger.

15. The system of claim 1 wherein the first flow path includes a spiral-shaped conduit having a two-pass coil arrangement with an inner spiral portion positioned radially inwardly from an outer spiral portion.

16. The system of claim 1, further comprising a valve positioned along the second flow path, the valve including a first element having first holes and a second element having second holes laterally offset from the first holes, at least one of the first and second elements being movable toward and away from the other.

* * * * *

UNITED STATES PATENT AND TRADEMARK OFFICE

CERTIFICATE OF CORRECTION

PATENT NO. : 8,561,254 B2
APPLICATION NO. : 12/702217
DATED : October 22, 2013
INVENTOR(S) : Michael J. Roden It is certified that error appears in the above-identified patent and that said Letters Patent is hereby corrected as shown below:

In the claims

In column 10, line 11, in claim 9, before "muffler" delete "flow".

Signed and Sealed this
Twenty-fourth Day of November, 2015

Michelle K. Lee
*Director of the United States Patent and Trademark Office*